(12) United States Patent
Runkel et al.

(10) Patent No.: US 11,185,943 B2
(45) Date of Patent: Nov. 30, 2021

(54) METHOD AND DEVICE FOR PRODUCING A CONTINUOUS STRIP-SHAPED COMPOSITE MATERIAL

(71) Applicant: SMS Group GmbH, Duesseldorf (DE)

(72) Inventors: Thomas Runkel, Siegen (DE); Jochen Wans, Meerbusch (DE); Axel Weyer, Wuppertal (DE)

(73) Assignee: SMS GROUP GMBH, Duesseldorf (DE)

( * ) Notice: Subject to any disclaimer, the term of this patent is extended or adjusted under 35 U.S.C. 154(b) by 225 days.

(21) Appl. No.: 16/461,910

(22) PCT Filed: Nov. 16, 2017

(86) PCT No.: PCT/EP2017/079381
§ 371 (c)(1),
(2) Date: May 17, 2019

(87) PCT Pub. No.: WO2018/091562
PCT Pub. Date: May 24, 2018

(65) Prior Publication Data
US 2019/0329307 A1      Oct. 31, 2019

(30) Foreign Application Priority Data

Nov. 18, 2016  (DE) .................. 102016222813.7
Dec. 7, 2016   (DE) .................. 102016224412.4
Dec. 28, 2016  (DE) .................. 102016226277.7

(51) Int. Cl.
*B21B 1/22*      (2006.01)
*B32B 15/01*     (2006.01)
(Continued)

(52) U.S. Cl.
CPC .............. *B23K 20/04* (2013.01); *B21B 1/02* (2013.01); *B21B 1/04* (2013.01); *B21B 1/22* (2013.01);
(Continued)

(58) Field of Classification Search
CPC .... B23K 20/04; B23K 2101/16; B21B 1/466; B21B 1/26; B21B 2001/383; B21C 47/22; B32B 15/011; B21D 39/03
See application file for complete search history.

(56) References Cited

U.S. PATENT DOCUMENTS 2,753,623 A    7/1956   Boessenkool
3,095,500 A    6/1963   Jost
(Continued)

FOREIGN PATENT DOCUMENTS

CN       1030375 A       1/1989
CN     201105358 Y       8/2008
(Continued)

OTHER PUBLICATIONS

Japanese Office Action (translated in German) for appl'n No. JP 2019-526612, dated Jul. 9, 2020, dated Jul. 15, 2020.
(Continued)

*Primary Examiner* — Jermie E Cozart
(74) *Attorney, Agent, or Firm* — Abelman, Frayne & Schwab (57) ABSTRACT

A device and method for producing a continuous strip-shaped composite material including a base material of metal, which is unwound in the form of a metal strip by a first coil-unwinding apparatus, and at least one cladding material of metal, which is unwound in the form of a metal strip by a second coil-unwinding apparatus. The metal base and cladding metal strips unwound by the respective coil-unwinding apparatuses are brought together in the hot state
(Continued)

of at least 720 degrees Celsius. The unwound base and cladding metal strips brought toward each other and are joined by hot-rolling such that a single continuous strip-shaped composite material is thereby formed by roll cladding such that the composite material includes the base material and the cladding material.

18 Claims, 4 Drawing Sheets

(51) Int. Cl.
| | |
|---|---|
| *B21D 39/03* | (2006.01) |
| *B21B 1/26* | (2006.01) |
| *B21B 1/02* | (2006.01) |
| *B22D 11/14* | (2006.01) |
| *B22D 11/16* | (2006.01) |
| *C21D 8/02* | (2006.01) |
| *C21D 9/56* | (2006.01) |
| *C21D 9/60* | (2006.01) |
| *B21B 1/46* | (2006.01) |
| *B21B 1/04* | (2006.01) |
| *B23K 20/26* | (2006.01) |
| *B23K 20/04* | (2006.01) |
| B23K 103/04 | (2006.01) |
| B21B 1/38 | (2006.01) |
| B23K 101/16 | (2006.01) |
| B21C 47/22 | (2006.01) |

(52) U.S. Cl.
CPC .............. *B21B 1/466* (2013.01); *B21D 39/03* (2013.01); *B22D 11/142* (2013.01); *B22D 11/16* (2013.01); *B23K 20/26* (2013.01); *B32B 15/011* (2013.01); *C21D 8/0205* (2013.01); *C21D 8/0215* (2013.01); *C21D 8/0226* (2013.01); *C21D 9/561* (2013.01); *C21D 9/562* (2013.01); *C21D 9/60* (2013.01); *B21B 1/26* (2013.01); *B21B 2001/028* (2013.01); *B21B 2001/225* (2013.01); *B21B 2001/383* (2013.01); *B21C 47/22* (2013.01); *B23K 2101/16* (2018.08); *B23K 2103/04* (2018.08); *B32B 2250/02* (2013.01)

(56) References Cited

U.S. PATENT DOCUMENTS

| | | | |
|---|---|---|---|
| 4,260,095 | A | 4/1981 | Smith |
| 4,684,053 | A | 8/1987 | Fastner |
| 4,831,708 | A | 5/1989 | Yoshiwara |
| 7,942,029 | B2 | 5/2011 | Baumer |

FOREIGN PATENT DOCUMENTS

| | | |
|---|---|---|
| CN | 101389428 A | 3/2009 |
| CN | 103310077 | 9/2013 |
| CN | 105834214 A1 | 8/2016 |
| CN | 105980072 A | 9/2016 |
| CN | 108787745 A | 11/2018 |
| DE | 1271519 | 6/1968 |
| EP | 0004063 | 9/1979 |
| EP | 1690606 | 8/2006 |
| EP | 1980345 | 10/2008 |
| JP | S59220292 A | 12/1984 |
| JP | 62166088 | 7/1987 |
| JP | 63104789 | 5/1988 |
| JP | H01278980 A | 11/1989 |
| JP | 2008212947 A | 9/2008 |
| JP | 2010094684 A | 4/2010 |

OTHER PUBLICATIONS

Office Action received for the Chinese Patent Application No. 201780071511.4, dated Sep. 3, 2020, 5 pages (3 pages of Original Copy and 2 pages of English Translation).

METHOD AND DEVICE FOR PRODUCING A CONTINUOUS STRIP-SHAPED COMPOSITE MATERIAL

CROSS-REFERENCES TO RELATED APPLICATIONS

This application claims the benefit under 35 U.S.C. § 371 to International application PCT/I132017/079381, filed Nov. 16, 2017, which claims priority to German application numbers DE 10 2016 222 813.7 filed Nov. 18, 2016, DE 10 2016 224 412.4 filed Dec. 7, 2018, and DE 10 2016 226 277.7 filed Dec. 28, 2016, the content of which are incorporated herein by reference in their entireties.

FIELD OF TECHNOLOGY

The invention relates to a method for producing a continuous strip-shaped composite material.

BACKGROUND OF RELATED PRIOR ART

According to the prior art, bringing together at least two matched materials made of metal and/or steel to form a composite material by means of roll and/or hot welding is well-known. This is disclosed, for example, in EP 1 690 606 B1, EP 201 202 61, EP 053 600 B1, and EP 04 063 B1. Accordingly, plate-shaped sheets are first placed atop one another, subsequently welded together to form a sheet pack, and then hot-rolled to form a roll-cladded hot strip or composite material. Such technology has the disadvantage that the interim step, according to which the plate-shaped sheets placed atop one another are first welded together, represents additional expense for the production sequence and limits the maximum production capacity.

According to the prior art, connecting metal parts in a solid phase in the form of metal strips is also known. In this case, the individual metal strips of coils are unwound, then heated and placed in contact with each another, to then be hot-rolled together to produce a strip-shaped composite material. This is known, for example, from DE 1 427 387 A, DE 1 271 519 A, and CN 102310077 A. The matched materials used here consist, on one hand, of a metal strip made of high-grade steel or stainless steel, and, on the other hand, of a conventional steel, e.g., a carbon steel. The combination of matched materials disadvantageously leads to a limited product spectrum.

SUMMARY

When processing steel, there is hot-rolling of the material, typically at a temperature above the recrystallization temperature of steel, i.e., at a temperature of >720° C., for example.

Accordingly, the object of the invention is to enable a larger product spectrum when producing a continuous metal strip in the form of a strip-shaped composite material.

A method according to the present invention is used to produce a continuous metal strip in the form of a strip-shaped composite material, having the following steps: (i) Provision of a base material made of metal, which, in the form of a metal strip, is unwound by a first coil-unwinding apparatus, and provision of at least one cladding material made of metal, which, in the form of a metal strip, is unwound by a second coil-unwinding apparatus; (ii) joining together of the metal strip unwound by the first coil-unwinding apparatus and of the metal strip unwound by the second coil-unwinding apparatus in the hot state; and (iii) hot-rolling of the unwound metal strips brought toward each other so that a single continuous strip-shaped composite material consisting of the base material and the cladding material is formed by means of roll cladding. Both the base material and the cladding material and the metal strips thereby unwound each consist of steel, particularly not of a high-grade steel.

In the same manner, the invention provides for a device for producing a continuous metal strip in the form of a strip-shaped composite material. The device comprises at least one first coil-unwinding apparatus, with which a metal strip made of metal is provided, which serves as the base material; at least one second coil-unwinding apparatus, with which a metal strip is provided, which serves as the cladding material; at least one rolling mill in the form of a roll-cladding apparatus, which is arranged in line with the first and the second coil-unwinding apparatuses and is arranged downstream thereof; a joining apparatus arranged between the coil-unwinding apparatus on one side and the roll-cladding apparatus on the other side, by means of which the metal strips unwound by the coil-unwinding apparatuses can be brought toward each other in the hot state. In this case, a structure of matched materials formed from the metal strips unwound by the coil-unwinding apparatuses can be hot-rolled in the roll-cladding apparatus so that a single continuous strip-shaped composite material consisting of the base material and cladding material results by means of roll cladding. Both the base material and the cladding material consist of steel, wherein at least one cleaning apparatus, preferably at least one descaling apparatus, by means of which at least one metal strip unwound by the coil-unwinding apparatuses can be cleaned, preferably descaled, is arranged between the coil-unwinding apparatus on one side and the joining apparatus on the other side.

In terms of the present invention, the following aspects should be understood as follows:

In terms of the present invention, the "joining of the metal strips" feature, as is defined, for example, for step (ii) of the method according to the invention, should be understood to the extent that the metal strips are brought towards each other. This can mean that the matched materials do not yet make contact during step (ii) and/or at the end thereof. In any case, the aforementioned matched materials are brought towards each other by means of the joining according to step (ii), which is implemented in the joining apparatus, such that subsequently, namely in step (iii) of the method according to the invention and/or in the roll-cladding apparatus of the device according to the invention, a structure formed from the metal strips unwound by the respective coil-unwinding apparatuses can be hot-rolled.

The "hot" attribute and/or the definition "in the hot state," which is mentioned in connection with step (ii), relates to the temperature of the matched materials in the form of the individually unwound metal strips and should be understood to the extent that the temperature is above the recrystallization temperature of steel (e.g., 720° C.).

The invention is based on the essential finding that both the base material and the cladding material consist of steel. This means that the metal strips, which are unwound by the first coil-unwinding apparatus and by the second coil-unwinding apparatus and after being suitably brought towards each other and then hot-rolled to form a single continuous strip-shaped composite material, each consist of steel or a steel alloy, but not of a high-grade steel. In this manner, a broad product spectrum is possible for the produced strip-shaped composite material. In order to remove impurities and/or scaling, at least one cleaning apparatus, preferably at least one descaling apparatus, which is arranged between the coil-unwinding apparatuses on one side and the joining apparatus on the other side, is provided for the device according to the invention. Due to the cleaning apparatus, the surfaces of the metal strips, which are placed in contact with each other during hot rolling according to step (iii), are cleaned, preferably descaled, in order to ensure a good connection between the matched materials by means of the roll cladding.

Steel or steel alloys can be used as the material for the base material and/or the cladding material. Essentially, it is possible for the present invention for the metal strips unwound by the coil-unwinding apparatuses to consist of different material grades. For example, different grades of steel can be used, which are then combined to form a single continuous strip-shaped composite material in step (iii) of the method according to the invention.

In an advantageous further embodiment of the invention, at least one coil-unwinding apparatus may be accommodated in a heatable environment. Thus, the coil-unwinding apparatus can be heated to a predefined temperature, while a cladding material thereof in the form of a metal strip is unwound in step (i). As a result of this, the unwound metal strip then already has a predefined temperature, preferably greater than the recrystallization temperature of steel, when it is transported in the direction of the joining apparatus and subsequently to the roll-cladding apparatus. Appropriately, all of the coil-unwinding apparatuses may be accommodated in separate heatable environments, e.g., in the form of a heatable chamber or the like, such that all of the strips thereby unwound are brought to the correct temperature for further machining. The heating of the coil-unwinding apparatuses and/or the thereby unwound metal strips can also be implemented in an inert gas atmosphere.

In an advantageous further embodiment of the method according to the invention, a speed of at least one matched material formed from the metal strips unwound by the coil-unwinding apparatuses is specifically influenced before step (ii). The influencing of the speed of at least one of these two matched materials can take place in a controlled or regulated manner, as a function of further process variables, which is explained in detail in the following. The influencing of the speed of a metal strip can be implemented directly with a corresponding coil-unwinding apparatus by which it is unwound.

The hot rolling of the unwound metal strips to form a single continuous strip-shaped composite material by means of hot rolling is improved thereby when the temperatures of the matched materials are adapted to each other before the hot rolling in step (iii) takes place. In doing so, it may also be advantageous to specifically adjust to different temperatures based on different material qualities. To this end, at least one of the metal strips is heated before step (ii) and/or before step (iii) in order to specifically influence the temperature thereof and to adapt to the temperature of the respective other matched material. In this case, it is also possible to implement the heating for both or all metal strips simultaneously. In order to heat a metal strip, at least one heating apparatus is provided, which may be arranged upstream of the joining apparatus and/or as a part thereof, wherein the metal strips are also guided through the heating apparatus. An especially high input of energy can be achieved, for example, with a heating apparatus in the form of an induction heater, associated with the advantage that it only requires a small installation space while simultaneously providing high energy density.

An advantageous further embodiment of the invention is that the metal strips unwound by the coil-unwinding apparatuses are laterally guided before step (ii) in order to align the matched materials relative to one another. In a similar manner, this may also take place during step (ii) and/or before step (iii). To this end, at least one lateral-influencing apparatus is provided, which may be arranged upstream of the joining apparatus and/or as a part thereof. As a supplement or as an alternative to this, the lateral-influencing apparatus may be arranged upstream of the roll-cladding apparatus. The lateral-influencing apparatus may be formed, for example, in the form of a guide roller or guide ruler, with which the side edges of the slabs come into contact with each other in order to align them laterally to one another as explained.

In an advantageous further embodiment of the invention, the aforementioned lateral-influencing apparatus may be formed in the form of a guide ruler, which is moved in the direction of the middle of the strip by means of an actuator, particularly with a predefined force. In this manner, an alignment of the two matched materials is also possible in the direction of the middle of the strip.

An advantageous further embodiment of the invention may be provided in that a lateral-influencing apparatus, preferably in the form of a guide ruler, is also provided downstream of the roll-cladding apparatus. For this case, it is ensured that the continuous strip-shaped composite material created is moved laterally after step (iii) as well, for example, in order to guide the composite material, centered in the middle of a rolling stand, through the rolling line and its corresponding rolling mill. In doing so, there may also be a provision that a guide ruler is moved in the direction of the middle of the strip with a predefined force in order to have the composite material created make contact and be guided at its side edges (optionally back in the direction of the middle of the strip).

The joining of the individual matched materials by means of hot rolling in step (iii) and/or by means of the roll-cladding apparatus is optimized when at least one metal strip unwound by a coil-unwinding apparatus is suitably cleaned before step (iii), namely on a surface which is opposite another metal strip and thus making contact during the hot rolling in step (iii). Preferably, two or all metal strips are cleaned on their surfaces opposite one another. To this end, at least one cleaning apparatus is provided for the device according to the invention, which is arranged between the coil-unwinding apparatus(es) on one side and the joining apparatus on the other side. Optionally, the cleaning apparatus may also form a part of the joining apparatus. Such cleaning of the metal strips may be done mechanically, for example, by means of jet streaming, brushing, grinding, planing, milling, or the like. As a supplement or alternative thereto, it is possible to implement the cleaning of the metal strips in the form of a descaler, wherein a fluid, preferably high-pressure water, is directed onto the surfaces of the metal strips opposite one another. For this case, the cleaning apparatus is formed as a descaling apparatus, by means of which a fluid can be applied, preferably under high pressure, onto the surface of at least one metal strip. The descaling of the metal strips is especially advantageous for this due to the use of steel or a steel alloy.

The joining of the individual matched materials by means of the hot rolling in step (iii) and/or by means of the roll-cladding apparatus can be thereby further optimized such that a surface temperature of at least one metal strip unwound by a coil-unwinding apparatus is changed before step (iii) and/or upstream of the roll-cladding apparatus. To this end, a temperature-influencing apparatus is provided for the device according to the invention, which is positioned between the joining apparatus and a roll-cladding apparatus arranged directly downstream thereof. Preferably, such a change in surface temperature is implemented by increasing the temperature, wherein the temperature-influencing apparatus may be formed, for example, as a radiant heater or the like, which is directed onto the surface of at least one metal strip. As an alternative to this, there may also be a provision to reduce the surface temperature of at least one of the aforementioned matched materials in order—in the case of steel or a steel alloy—to reduce the formation of scaling before the actual implementation of the hot rolling in step (iii).

The quality of a joining of at least two metal strips, from which the desired continuous strip-shaped composite material is produced, can further be improved in that at least one metal strip unwound by a coil-unwinding apparatus is guided in an inert gas atmosphere. To this end, an inert gas apparatus is provided, which is arranged upstream of the joining apparatus, and/or is formed as a part of the joining apparatus and/or as a part of a roll-cladding apparatus arranged directly downstream adjacent the joining apparatus. Accordingly with the method according to the invention, at least one of the metal strips, preferably all metal strips, is guided before step (ii) and/or during step (ii) and/or before step (iii) in an inert gas atmosphere. Because the metal strips consist of steel or a steel alloy, the formation of scaling is thereby at least reduced or excluded altogether.

The joining of the individual metal strips can be further improved when a profiling of at least one metal strip unwound by a coil-unwinding apparatus takes place before step (iii) and/or upstream of the roll-cladding apparatus. With such a profiling, at least one of the aforementioned matched materials can be chamfered on a side edge at an angle. As a supplement and/or alternative to this, there may be a provision with such profiling that at least one metal strip is trimmed by a vertical cut. In any case, the aforementioned profiling ensures that the matched materials, which are hot-rolled in step (iii) and/or by the roll-cladding apparatus, are positioned on top of each other or aligned with respect to each other in the area of their edges as well such that a joining of the matched materials in the form of the metal strips is assured in a homogenous manner by the subsequent hot rolling.

In an advantageous further embodiment of the invention, it may be provided that an inner material quality, particularly the joining quality, of the single continuous strip-shaped composite material produced is detected, preferably by x-ray and/or ultrasound, following step (iii). To this end, a measuring apparatus, by means of which a material quality of the single continuous strip-shaped composite material produced can be detected, is provided downstream of a roll-cladding apparatus, for the device according to the invention. A process signal is then expediently generated by means of a control device based on the detected material quality, with which a control circuit can be formed for the method according to the invention.

In an advantageous further embodiment of the method according to the invention, it may be provided that the method is implemented automatically as a function of at least one predefined process variable. With reference to the previous explanation of the invention, the process variable may consist, for example, of the speed present before step (ii) for the metal strips unwound by the coil-unwinding apparatuses and/or of the material quality of the continuous strip-shaped composite material produced. Furthermore, such a process variable may also be selected from the group formed particularly from a temperature difference in the metal strips before step (ii) and/or before step (iii), from the different material properties and the thickness ratio between the matched materials and/or the metal strips used, a respective speed of the working rollers of the roll-cladding apparatus, and/or a thickness reduction, which is achieved in step (iii) for the single strip-shaped composite material produced. Based on the aforementioned possible process variables, the method according to the invention may also be formed as a control circuit and implemented automatically accordingly.

In an advantageous further embodiment of the invention, it may be provided that a speed of the respective working rollers of a roll-cladding apparatus are actuated such that a potential "ski formation" of the strip-shaped composite material, which is hot-rolled by the or in the roll-cladding apparatus, is counteracted during the exit from the roll-cladding apparatus. This is particularly recommended for a first roll-cladding apparatus, which is arranged downstream directly adjacent to the joining apparatus. Accordingly, a further transport of the continuous strip-shaped composite material produced is possible in the rolling line, without "ski formation" at the front end of the strip-shaped composite material produced and thereby without worry of damage from rolling mills downstream of the joining apparatus.

In an advantageous further embodiment of the invention, it may be provided that the continuous strip-shaped composite material produced is separated and/or isolated following step (iii) and/or downstream of a roll-cladding apparatus, which is directly adjacent to the joining apparatus. As a supplement and/or alternative, it may be provided that a holding-down device, by means of which ski formation is prevented in the single continuous strip-shaped composite material produced, is positioned downstream of a roll-cladding apparatus arranged directly at the joining apparatus.

In an advantageous further embodiment of the invention, it may be provided that a third coil-unwinding apparatus is provided, with which a further cladding material is provided in the form of a metal strip in step (i) of the method according to the invention. The third coil-unwinding apparatus is likewise arranged in line with the roll-cladding apparatus, preferably upstream thereof. Accordingly, subsequent steps (ii) and (iii) of the method according to the invention are implemented with a total of three layers, which formed from the unwound metal strips. As an alternative to this, it may be provided that the metal strip, which is unwound by the third coil-unwinding apparatus, is connected to the single continuous strip-shaped composite material already formed in step (iii) in the hot state, with reimplementation of steps (ii) and (iii). For this case, the third coil-unwinding apparatus is arranged downstream of a first roll-cladding apparatus, which is directly adjacent to the joining apparatus. In any case, when using, e.g., three coil-unwinding apparatuses, a continuous strip-shaped composite material can be produced which consists, e.g., of steels in its uppermost and lowermost layer with the same property profiles, wherein a middle layer of the composite material is formed, e.g., from a steel which differs in its properties from the materials used for the edge layers.

In an advantageous further embodiment of the method according to the invention the cladding material is applied, in step (iii), on opposite sides of the metal strip consisting of the base material, wherein the cladding material consists of the same material and is unwound by separate coil-unwinding apparatuses in each case.

In an advantageous further embodiment of the invention, it may be provided that one or more intermediate layers in solid, liquid, or powdered form, are provided between the metal strips to be joined together. Such an intermediate layer may passivate or activate the opposite surfaces of the metal strips. As a result of this, the tendency to scale is reduced on the surfaces of the metal strips, and/or the diffusion processes between the metal strips are influenced in an advantageous manner.

The device according to the invention may be characterized as an RB system, wherein RB is an abbreviation for roll bonding.

Further advantages of the present invention consist of the following aspects:
  Increased production capacity
  Better efficiency
  Expansion of the types of steel to be produced
  Production of roll-cladded heavy plates, and
  Production of roll-cladded coils.

BRIEF DESCRIPTION OF THE DRAWINGS

Exemplary embodiments of the invention are described in the following in detail by means of a schematically simplified drawing in which.

DETAILED DESCRIPTION

Preferred embodiments of a device 10 according to the invention and components thereof are explained in the following with reference to FIGS. 1 to 4, wherein the device 10 is used to produce a metal strip in the form of a continuous strip-shaped composite material 11. Equivalent features in the drawing are each provided with the same reference numbers. At this juncture, particular reference is made to the fact that the drawing is merely simplified and particularly not shown to scale.

Figure 1:
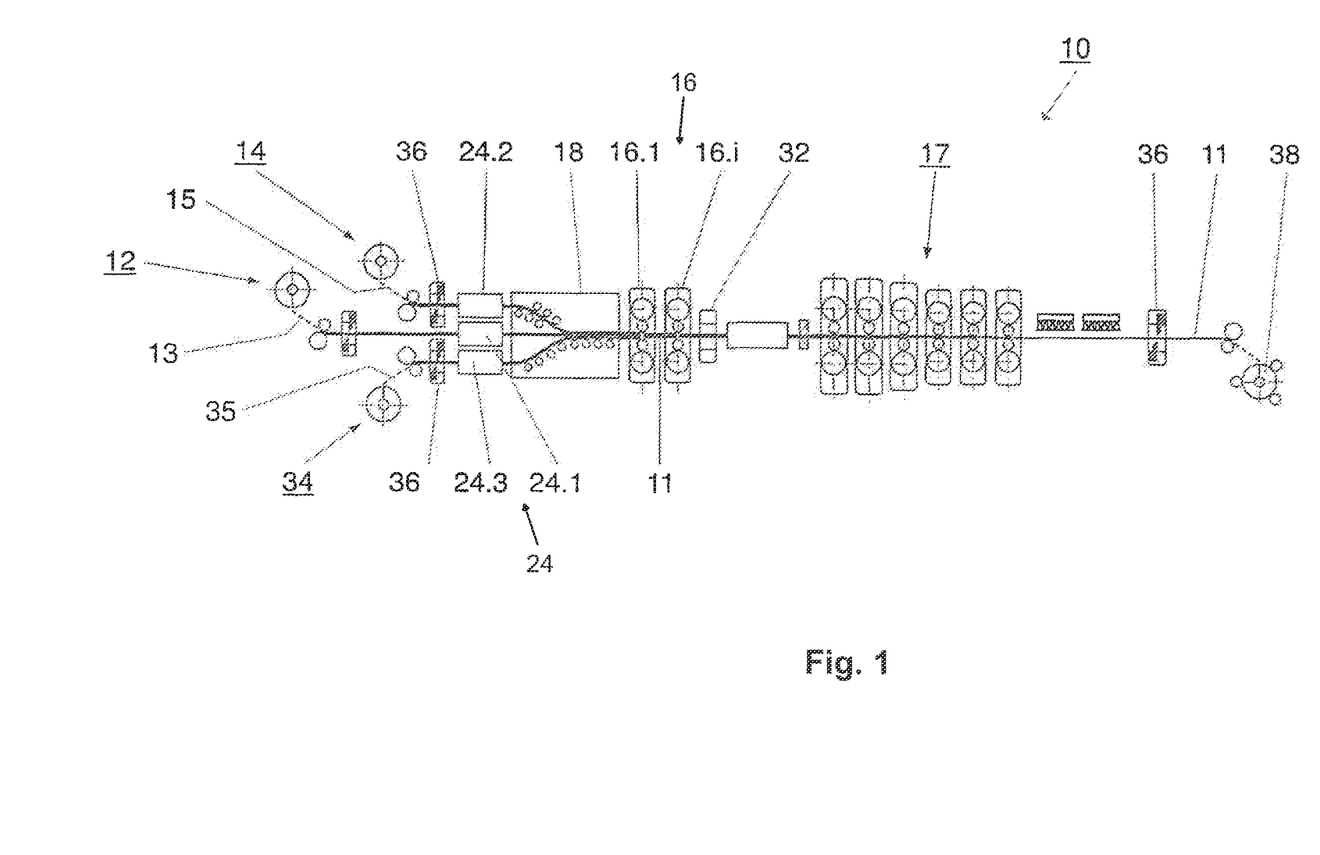
FIG. 1 shows a general side view of a device according to the invention, in which three coil-unwinding apparatuses are used.

FIG. 1 shows a generally simplified side view of the device 10 according to a first embodiment.

The device 10 comprises a first coil-unwinding apparatus 12, from which a base material is unwound in the form of a metal strip 13. Furthermore, the device 10 comprises a second coil-unwinding apparatus 14 and a third coil-unwinding apparatus 34, from which a cladding material is unwound in the form of metal strips 15 and/or 35. FIG. 1 clearly shows that the second coil-unwinding apparatus 14 and the third coil-unwinding apparatus 34 are arranged on respective opposite sides of the first coil-unwinding apparatus 12. Metal strips 13, 15, and 35 unwound by the aforementioned coil-unwinding apparatuses 12, 14 and 34 are subsequently jointly guided through a joining apparatus 18 and thereby brought towards one another. The device 10 further comprises at least one rolling mill 16 in the form of a roll-cladding apparatus 16.1, which is arranged directly after the joining apparatus 18 and thus downstream thereof. The function of the roll-cladding apparatus 16.1 is explained separately in the following.

The joining apparatus 18 is used to bring the unwound metal strips 13, 15, and 35 towards one another. With the embodiment shown in FIG. 1, it may be provided that the metal strips are placed in contact with each other as early as the joining apparatus 18. With an alternative embodiment of the joining apparatus 18, which is shown generally simplified in the side view from FIG. 2 and is part of the device from FIG. 1, the unwound metal strips do not make contact with one another within the joining apparatus 18 but rather not until outside and downstream when they enter the roll-cladding apparatus 16.1 positioned directly adjacent thereto. For this alternative joining apparatus 18 according to FIG. 2, it should be referenced at this juncture that only metal strips 13 and 15 are shown in the representation of FIG. 2 for simplification purposes, wherein metal strip 35, which is unwound by the third coil-unwinding apparatus 34, is not shown.

Figure 2:
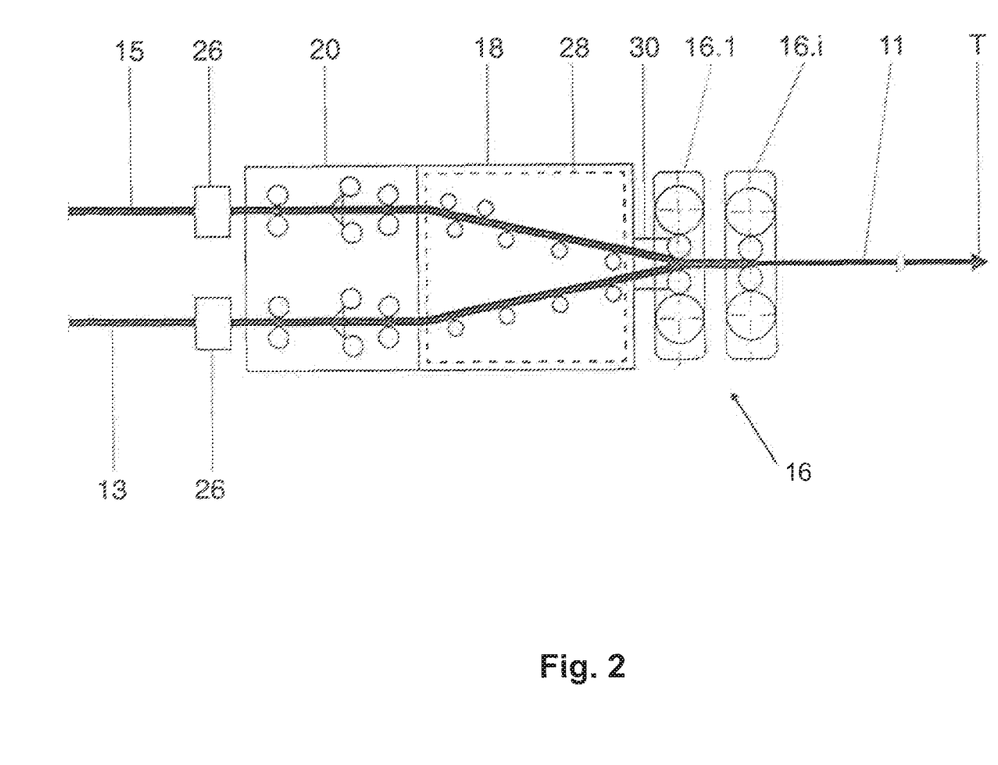
FIG. 2 shows a general side view of a modification of the joining apparatus, which may be part of the device from FIG. 1.
Figure 3:
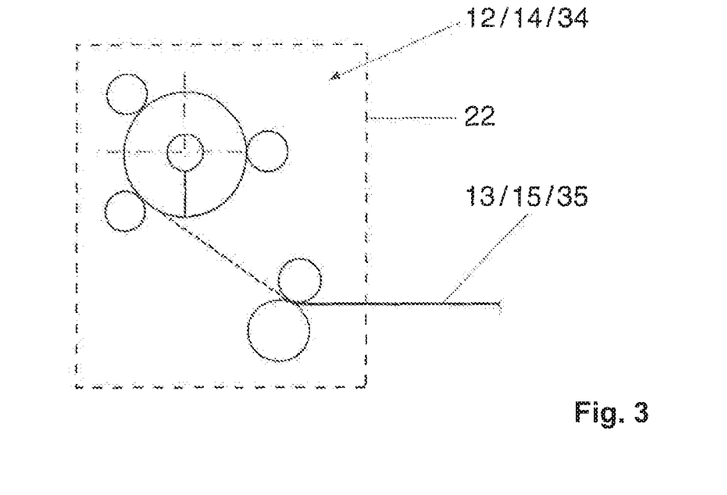
FIG. 3 shows a generally simplified enlarged view of a modified coil-unwinding apparatus, which may be part of the device from FIG. 1.

FIG. 2 shows a transport direction indicated with the arrow labeled "T," in which the continuous strip-shaped composite material 11 produced is transported and/or moved (from left to right in the drawing plane). With respect to the representations from FIG. 1, it is clear that the composite material 11 herein is moved in the same direction, namely from left to right (when viewed in the drawing plane).

The speed at which the unwound metal strips 13, 15, and 35 are transported in the direction of the joining apparatus 18 can be controlled, preferably regulated. This is possible by means of a suitable actuation of a motorized drive, which can be provided for each of the individual coil-unwinding apparatuses 12, 14, and 34. The motorized drives of the individual coil-unwinding apparatuses are preferably actuated by a common control device (not shown). Thus, metal strips 13, 15, and 35 preferably enter the joining apparatus 18 at the same speed.

The device 10 comprises heating apparatuses 24, each of which are arranged in a line between the individual coil-unwinding apparatuses 12, 14, 34 and the joining apparatus 18. Specifically, a first heating apparatus 24.1 is arranged between the first coil-unwinding apparatus 12 and the joining apparatus 18. In the same manner, a second heating apparatus 24.2 is arranged between the second coil-unwinding apparatus 14 and the joining apparatus 18, wherein a third heating apparatus 24.3 is arranged between the third coil-unwinding apparatus 34 and the joining apparatus 18. The unwound metal strips 13, 15, 35 are guided through the assigned heating apparatuses 24.1, 24.2, and 24.3 and, in doing so, are heated according to the principle of through heating. As a result of this, potential temperature differences between the individual metal strips, which can be adjusted, e.g., as a result of transport distances of different length, are balanced. Thus, metal strips 13, 15, 35 enter the joining apparatus 18 at a predefined temperature.

The device 10 has lateral-influencing apparatuses, each of which are arranged upstream of the joining apparatus 18 and in line with the respective coil-unwinding apparatuses 12, 14, 34. The lateral-influencing apparatuses are merely indicated symbolically by the reference number 26 in the representation of FIG. 2 and may be formed, for example, by guide rulers. Accordingly, the unwound metal strips are laterally guided by these guide rulers and thereby aligned relative to one another. At this juncture, it should be specifically referenced that the lateral-influencing apparatuses 26 may also be arranged within the joining apparatus 18 and thus be formed as a part of the joining apparatus 18.

The previously mentioned roll-cladding apparatus 16.1 is used to implement hot rolling for metal strips 13, 15, 35 and thus to produce a continuous strip-shaped composite material 11 therefrom by means of roll cladding. The side view from FIG. 4b generally shows three-layer roll welding of three matching materials in simplified form, which may consist, e.g., of metal strips 13, 15, 35 when they are placed in contact with working rollers A1, A2 of the roll-cladding apparatus 16.1 and are guided between the working rollers A1, A2. The side view from FIG. 4b clearly shows that a composite is formed from metal strips 13, 15, 35 when they jointly enter the roll-cladding apparatus 16.1, the composite then being hot-rolled and/or roll-cladded to form the strip-shaped composite material 11 by working rollers A1, A2 of the roll-cladding apparatus.

Figure 4A:
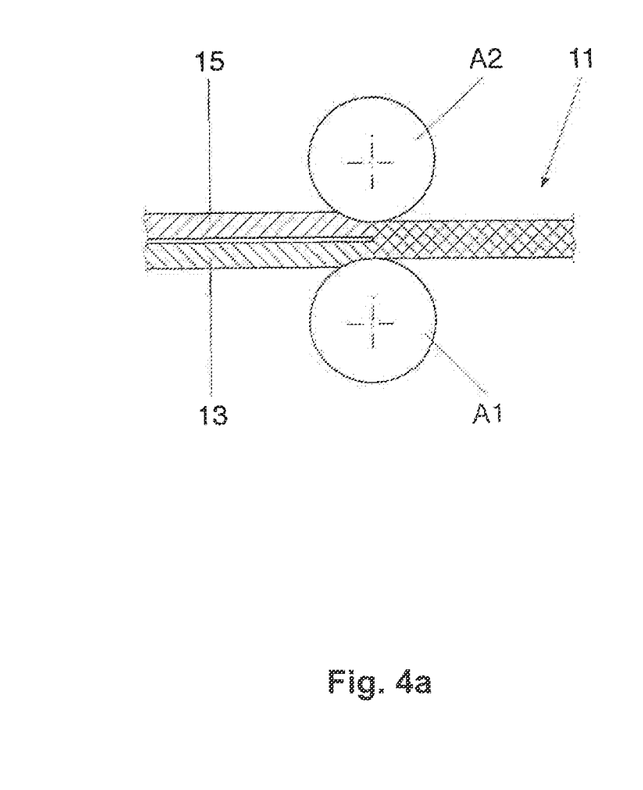
FIGS. 4a, 4b and 4c show sides views of the working rollers of a roll-cladding apparatus, which is part of the device from FIG. 1.
Figure 4B:
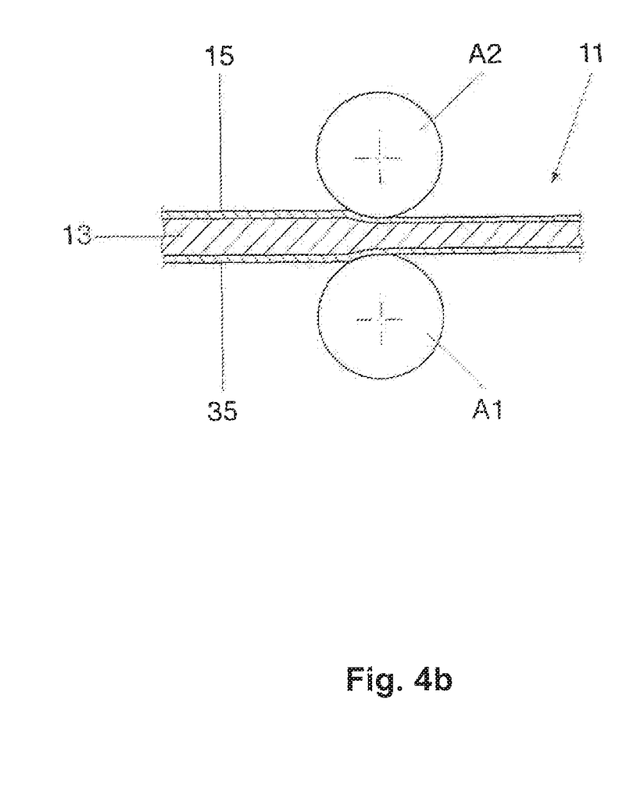

With the representation according to FIG. 4b, the metal strip 13 serves as a base material, wherein the other two metal strips, 15 and 35, serve as the cladding material, which is cladded on opposite sides of the metal strip 13. Reference is made with respect to this that different material and/or steel grades can be used for the base material (in the form of metal strip 13) on one side and for the cladding material (in the form of metal strips 15, 35) on the other side. The cladding material used for metal strips 15, 35 may consist of the same material or alternatively consist of different steel grades for each. Furthermore, reference is made to the fact that, contrary to the representation in FIG. 4b, the two metal strips 15, 35 may also be applied or cladded on the same side of metal strip 13.

After the roll-cladding apparatus 16.1 and/or downstream thereof, further rolling mills and/or roll-cladding apparatuses may be provided, with which hot rolling is implemented for the strip-shaped composite material 11. FIG. 1 shows, indicated by reference number 16.i, that at least one further roll-cladding apparatus or a plurality of such rolling mills may be arranged in the rolling line 17, downstream of roll-cladding apparatus 16.1. Furthermore, further rolling mills may be provided in the rolling line 17 downstream of roll-cladding apparatuses 16.i.

As shown by the representation in FIG. 2, the device 10 comprises a cleaning apparatus in the form of a descaling apparatus 20, which is arranged upstream of the joining apparatus 18. Metal strips 13, 15, 35 are suitably descaled by the descaling apparatus 20, which is therefore particularly advantageous because the metal strips each consist of steel or a steel alloy. Furthermore, the side view from FIG. 2 shows that the device 10 comprises an inert gas apparatus 28, which is integrated into the joining apparatus 18. In the representation from FIG. 2, the inert gas apparatus 28 is only indicated in simplified form by dashed lines. Before they are guided through the roll-cladding apparatus 16.1, metal strips 13, 15, 35 are guided through the inert gas apparatus 28 by means of hot rolling and/or roll cladding, which effectively reduces "fresh" scaling on the surfaces opposite one another of the metal strips 13, 15, 35.

The joining of the unwound metal strips 13, 15, 35 by means of hot rolling in step (iii) can be further improved in that a surface temperature of at least one of these matched materials is influenced, preferably increased, at their opposite respective sides. To this end, a temperature-influencing apparatus 30, which is symbolically shown in simplified form in the representation from FIG. 2, is arranged directly upstream of the roll-cladding apparatus 16.1.

The device further comprises at least one measuring apparatus 32, with which the material quality of the continuous strip-shaped composite material 11, which has been produced by means of hot rolling through the roll-cladding apparatus 16.1, can be detected. The measuring apparatus 32 is arranged, for example, after or downstream of the roll-cladding apparatus 16.1 and preferably functions according to the x-ray and/or ultrasound principle. To this end, it may be provided the corresponding sensors of the measuring apparatus 32 are to be arranged above and/or below the continuous strip-shaped composite material 11 such that an upper side and/or a lower side of the metal strip, in the form of the composite material 11, can thereby be tested with respect to its material quality and/or surface quality.

Separating apparatuses 36, for example in the form of pendulum or cylindrical shears or the like, are arranged at various points along the process line of the device 10. The separating apparatuses 36 enable removal and/or discharging of non-useable material. As a supplement and/or alternative, a discontinuous rolling operation of individual strips and/or an emergency operation with only one of the coil-unwinding apparatuses 12, 14, 34 can be implemented by using the separating apparatuses 36. The separating can also be implemented with the goal of improving the downstream process steps and/or for producing the lengths of the end product produced in this system. Reference is made with respect to this that the positions of the respective separating apparatuses 36 shown in FIG. 1 should only be considered examples.

The device 10 may also comprise a rolling line 17, with which the continuous strip-shaped composite material 11 produced can be rolled out to smaller thicknesses.

At least one reel 38 is provided at the end of the rolling line 17 in order to wind the continuous strip-shaped composite material 11 into a coil. A plurality of such reels 38 may expediently also be provided, with corresponding (not shown) apparatuses for switching among the individual reels 38. As a supplement and/or alternative, at least one storage area or the like may also be provided at the end of the rolling line 17 in order to remove sheets and/or heavy plates therefrom.

Figure 4C:
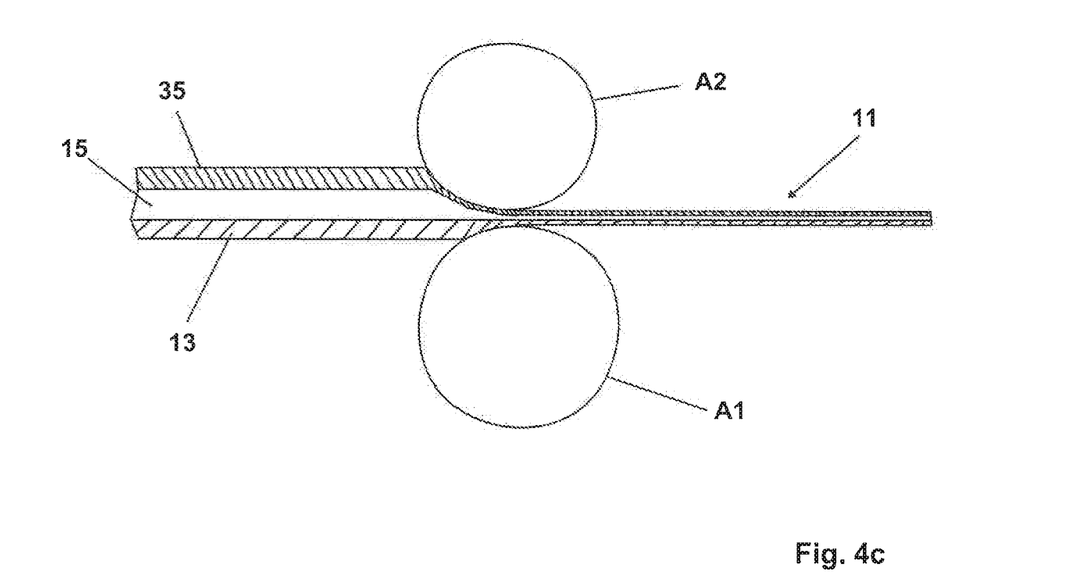

The device 10 according to FIG. 1 can be modified to the extent that a total of only two coil-unwinding apparatuses are used, e.g., the first coil-unwinding apparatus 12 and the second coil-unwinding apparatus 14. A joining of the metal strips 13, 15 unwound therefrom and the subsequent hot rolling into a single continuous strip-shaped composite material 11 then corresponds to the representation according to FIG. 2. In addition, reference is made for such modification of the device 10 to the extent that a joining, e.g., of only two matched materials, which may consist of metal strip 13 and metal strip 15, is shown in the simplified side view from FIG. 4a. Referring to FIG. 4c, in another embodiment the cladding strips 15 and 35 are both illustratively positioned on the same (e.g., upper) side of the base material 13.

A further modification of the device 10 according to FIG. 1 may take place in the manner such that at least one of the coil-unwinding apparatuses 12, 14, 34 is accommodated in a heatable chamber 22. This is shown in simplified form in the representation from FIG. 3. Such accommodation of a coil-unwinding apparatus 12, 14, 34 in the heatable chamber 22 ensures that a metal strip 13, 15, 35 unrolled therefrom already has a predefined temperature with respect to a joining of the individual metal strips 13, 15, 35 and the subsequent hot rolling to form a single continuous strip-shaped composite material 11. Preferably, all of the coil-unwinding apparatuses 12, 14, 34 are each accommodated separately in a heatable chamber 22.

The method according to the invention for producing the continuous strip-shaped composite material 11 can be implemented with the previously explained embodiments of the device 10 according to the invention. The method can be implemented automatically, and preferably regulated, as a function of at least one of the aforementioned process variables.

LIST OF REFERENCE NUMBERS

10 Device
11 Continuous strip-shaped composite material
12 First coil-unwinding apparatus
13 Metal strip (which is unwound by the first coil-unwinding apparatus 12)
14 Second coil-unwinding apparatus
15 Metal strip (which is unwound by the second coil-unwinding apparatus 14)
16.1 Roll-cladding apparatus
16.i (Further) roll-cladding apparatus(es)
17 Rolling line
18 Joining apparatus
20 Cleaning apparatus (e.g. descaling apparatus)
22 (Heatable) chamber (for accommodating a coil-unwinding apparatus)
24.1 First heating apparatus (e.g. induction heater)
24.2 Second heating apparatus (e.g. induction heater)
24.3 Third heating apparatus (e.g. induction heater)
26 Lateral-influencing apparatus (e.g. guide ruler)
28 Inert gas apparatus
30 Temperature-influencing apparatus
32 Measuring apparatus
34 Third coil-unwinding apparatus
35 Metal strip (which is unwound by the third coil-unwinding apparatus 34)
36 Separating apparatus (e.g. cylindrical shears)
38 Reel
A1, A2 Working rollers (of roll-cladding apparatus 16.1)
T Transport direction (for the strip-shaped composite material 11)

The invention claimed is:

1. A method for producing a continuous strip-shaped composite material comprising the steps of:
  (i) provisioning a base material of metal which is unwound in the form of a first metal strip formed of steel or alloy steel by a first coil-unwinding apparatus, and provisioning at least one cladding material of metal which is unwound in the form of a second metal strip formed of steel or alloy steel by a second coil-unwinding apparatus;
  (ii) joining of the first metal strip unwound by the first coil-unwinding apparatus and of the second metal strip unwound by the second coil-unwinding apparatus; and
  (iii) rolling of the first and second unwound metal strips brought towards one another such that a single continuous strip-shaped composite material consisting of the base material and the cladding material is thereby formed,
  wherein the first and second metal strips unwound by the respective first and second coil-unwinding apparatus are descaled by using high-pressure water before the step (ii), and the rolling of the first and second metal strips in step (iii) is carried out as hot rolling, where the first and the second coil-unwinding apparatus are accommodated in a heatable environment during step (i) such that a predefined temperature of at least 720° C. is set for the first and second metal strips unwound by the coil-unwinding apparatuses before steps (ii) and (iii) joining of the first and second metal strips in step (ii) is carried out in a hot condition, with the first and second metal strips each having a temperature of at least 720° C.,
  wherein before the step (iii), a surface temperature of the first and second metal strips is increased by using induction heating, and
  wherein during the step (ii) and before the step (iii), the first and second metal strips unwound by the respective first and second coil-unwinding apparatus are transported in an inert gas atmosphere.

2. The method according to claim 1, wherein the first and second metal strips are heated to a temperature above a recrystallization limit by an induction heater before step (ii) and/or during step (ii) and/or before step (iii).

3. The method according to claim 1, wherein the cladding material is applied, in step (iii), on opposite sides of the first metal strip consisting of the base material, wherein the cladding material consists of the same material and is unwound by respective separate coil-unwinding apparatuses in step (i).

4. The method according to according to claim 1, wherein the base material and the at least one cladding material are formed from different grades of steel, wherein a further cladding material in the form of a third metal strip is unwound by a third coil-unwinding apparatus in step (i), and subsequent steps (ii) and (iii) are implemented with a total of three layers, which are formed from the first, second and third metal strips unwound by the respective fast, second and third coil-unwinding apparatuses.

5. The method according to claim 4, wherein the second and third metal strips are formed from different materials, wherein said second and third metal strips are applied either on opposite sides of the first metal strip consisting of the base material or on the same side thereof.

6. The method according to claim 1, wherein the first and second metal strips unwound by the first and second coil-unwinding apparatuses are laterally guided during step (i) and/or before step (ii) and/or during step (ii) and/or before step (iii) in order to thereby align the respective first and second metal strips with respect to one another, wherein a lateral-influencing apparatus is provided in the form of a guide ruler, which is moved in the direction of the middle of a respective at least one of the first and second strips by an actuator with a predefined force.

7. The method according to claim 1, wherein the first and second metal strips unwound by the respective first and second coil-unwinding apparatus are guided in an inert gas atmosphere.

8. The method according to claim 1, wherein a material quality of the single continuous strip-shaped composite material produced is detected by x-ray and/or ultrasound following step (iii), such that a process signal is generated by a control device based on the detected material quality, said process signal forming a control circuit for the method.

9. The method according to claim 1, wherein said method is automatically implemented as a function of at least one predefined process variable speed, present before step (ii), of the first and second metal strips unwound by the first kind second coil-unwinding apparatuses, from a temperature difference in the first and second metal strips before step (ii) and/or before step (iii), from different material properties and the thickness ratio of the matched materials and/or first and second metal strips used, from a respective speed of working rollers of a roll-cladding apparatus, and/or from a thickness reduction in the single continuous strip-shaped composite material achieved in step (iii).

10. The method according to claim 1, wherein at least one intermediate layer in solid, liquid, or powdered form, which passivates or activates the surfaces of the first and second metal strips opposite one another, is provided between the first and second metal strips to be joined together.

11. A device for producing a continuous strip-shaped composite material comprising:
at least one first coil-unwinding apparatus with which a first metal strip formed of steel or alloy steel is provided which serves as the base material;
at least one second coil-unwinding apparatus with which a second metal strip formed of steel or alloy steel is provided which serves as the cladding material;
at least one rolling mill in the form of a roll-cladding apparatus which is arranged in line with the first and the second coil-unwinding apparatus and is arranged downstream thereof;
a joining apparatus arranged between the first and second coil-unwinding apparatuses on one side and the roll-cladding apparatus on another side thereof, and
at least one cleaning apparatus including a high-pressure water descaling apparatus is arranged between the first and second coil-unwinding apparatuses, on one side, and the joining apparatus, on the other side, and with which the first and second metal strips unwound by the first and second coil-unwinding apparatuses are descaled, wherein the first and second coil-unwinding apparatuses are arranged in at least one heatable chamber under an inert gas atmosphere, wherein the first and second metal strips unwound by the first and second coil-unwinding apparatuses are joined by the joining apparatus in a hot state,
at least one temperature-influencing apparatus including an induction-heating apparatus is arranged between the joining apparatus and a roll-cladding apparatus provided directly downstream thereof, with which opposite surfaces of the first and second metal strips which are unwound by the respective first and second coil-unwinding apparatus are heated so that a strip-shaped composite material which is formed of the first and second metal strips unwound by the first and second coil-unwinding apparatuses can be hot-rolled in the roll-cladding apparatus wherein a single continuous strip-shaped composite material, which is formed of the base material and the cladding material, is produced, and
an inert gas apparatus forms part of the joining apparatus, wherein the first and second metal strips unwound by the respective first and second coil-unwinding apparatus are transported in the inert gas apparatus in the inert gas atmosphere.

12. The device according to claim 11, wherein at least one of the first and second coil-unwinding apparatus has a quick-change apparatus to replace coils, wherein the quick-change apparatus comprises a welding device in order to weld successive metal strips to one another.

13. The device according to claim 11, wherein at least one of the first and second coil-unwinding apparatus has a plurality of unwinding modules which can be successively placed into an unwind position, wherein said at least one coil-unwinding apparatus comprises a welding device in order to weld successive metal strips to one another.

14. The device according to claim 11, characterized in that at least one heating apparatus is provided upstream of the joining apparatus and/or as a part thereof, wherein the first and second metal strips unwound by the first and second coil-unwinding apparatuses are guided through said heating apparatus wherein the at least one heating apparatus (24) functions according to the principle of induction heating.

15. The device according to claim 11, wherein at least one lateral-influencing apparatus is arranged upstream of the joining apparatus or as a part thereof and/or upstream of the roll-cladding apparatus, wherein the first and second metal strips unwound by the first and second coil-unwinding apparatuses are selectively placed in contact with the lateral-influencing apparatus at their side edges in order to be aligned laterally with respect to each other, wherein the at least one lateral-influencing apparatus includes a guide ruler which can be moved in the direction of a middle of at least one of the first and second metal strips with a predefined force.

16. The device according to claim 11, wherein the inert gas apparatus is provided as a part of the joining apparatus and/or as a part of a roll-cladding apparatus which is arranged downstream directly adjacent to the joining apparatus, wherein at least one of the first and second metal strips is guided within said inert gas apparatus in the inert gas atmosphere, wherein the at least one of the first and second metal strips unwound by the respective coil-unwinding apparatuses is guided within said inert gas apparatus in the inert gas atmosphere.

17. The device according to claim 11, that wherein a measuring apparatus, of which detects a material quality of the single continuous strip-shaped composite material through x-ray and/or ultrasound, is provided downstream of the roll-cladding apparatus.

18. The device according to claim 11, further comprising a third coil-unwinding apparatus arranged in line with the roll-cladding apparatus and including a third metal strip to form another cladding material.

* * * * *